US006270051B1

(12) United States Patent
Power

(10) Patent No.: US 6,270,051 B1
(45) Date of Patent: Aug. 7, 2001

(54) DRIVE TRAIN MOUNT ADAPTER PLATE AND PIVOT BRACKET

(75) Inventor: Douglas L. Power, Kitchener (CA)

(73) Assignee: The Standard Products Company, Cleveland, OH (US)

( * ) Notice: Subject to any disclaimer, the term of this patent is extended or adjusted under 35 U.S.C. 154(b) by 0 days.

(21) Appl. No.: 09/320,110

(22) Filed: May 26, 1999

(51) Int. Cl.[7] .......... F16M 1/00

(52) U.S. Cl. .......... 248/638; 248/634; 267/140.11; 267/140.12

(58) Field of Search .......... 248/680, 638, 248/636, 562, 631, 674, 634; 267/140.11, 140.12

(56) References Cited

U.S. PATENT DOCUMENTS 2,769,656 11/1956 Lee .
5,551,661 * 9/1996 Bunker .......... 248/634
5,636,816 * 6/1997 Burton et al. .......... 248/674 X
5,636,826 6/1997 Nakagaki et al. .......... 248/562
5,788,207 * 8/1998 Bunker .......... 248/634

* cited by examiner

*Primary Examiner*—Ramon O. Ramirez
*Assistant Examiner*—Gwendolyn Baxter
(74) *Attorney, Agent, or Firm*—Fay, Sharpe, Fagan, Minnich & McKee, LLP

(57) ABSTRACT

An adapter plate for pivotally securing an isolating mount to a drive train component is provided. The adapter plate includes a body portion which can be secured to the drive train. The adapter plate also includes a pivot support formed on the body portion. The pivot support has a pivot member for pivotally securing a first end of the isolating mount. The adapter plate also includes a securing member formed on the body portion. The securing member has an aperture for aligning with a corresponding aperture at a second end of the isolating mount. The isolating mount can pivot about the pivot support during installation of the drive train component within a vehicle, and the isolating mount can be secured to the securing member to prevent pivotal movement after installation of the drive train component within the vehicle.

18 Claims, 2 Drawing Sheets

12
25
10
23
14
16
34
26
31

DRIVE TRAIN MOUNT ADAPTER PLATE AND PIVOT BRACKET

BACKGROUND OF THE INVENTION

1. Technical Field

The present invention is directed to an adapter plate for the drive train of an automotive vehicle or truck. More particularly, the present invention is directed to an adapter plate and pivot bracket which simplifies the installation of the drive train within the vehicle.

2. Discussion

Automotive vehicles, and especially trucks are typically equipped with a vibration isolating mount disposed between the vehicle drive train and the vehicle frame. The isolating mount provides additional cushioning between the drive train and the vehicle frame. The isolating mount also serves to support the drive train, as well as isolate vibration energy and impact energy from the vehicle frame up through the drive train. These mounts are typically hydraulic mounts, however a variety of rubber and/or elastomeric mounts are also suitable.

In the presently known applications, the isolating mount is secured directly to the underside of the transmission housing. The typical mount has one or more mounting studs which extend downwardly from the mount. When the drive train assembly, comprising the engine, transmission, and sometimes a transfer case is installed during vehicle assembly, the drive train assembly is typically installed at a sharp insertion angle and then pivoted into its normal horizontal position. During this procedure, the mounting studs must be located Within holes formed within the vehicle frame. This assembly task can be quite challenging because the mounting studs are fixed with respect to the drive train assembly, and can only be moved for alignment with their exact location by moving the entire drive train assembly.

In view of the disadvantages associated with the prior art techniques for securing the drive train assembly and mount within the vehicle, it is desirable to provide an adapter plate for securing the mount to the drive train assembly which allows an additional degree of freedom during the assembly process so that the mount can be aligned and secured to the vehicle frame quickly and easily. It is further desirable to provide an adapter plate which allows the mount to be pivotally secured to the drive train. As an additional feature, it is desirable to provide an adapter plate which allows the mount to be completely secured to the drive train after the drive train assembly is installed within the vehicle. Finally, it is desirable to provide an adapter plate and mount design which can be preassembled as one component prior to its attachment to the drive train assembly.

SUMMARY OF THE INVENTION

The present invention is directed to an adapter plate for pivotally securing an isolating mount to a drive train component. The adapter plate includes a body portion which can be secured to the drive train. The adapter plate also includes a pivot support formed on the body portion. The pivot support has a pivot member for pivotally securing a first end of the isolating mount. The adapter plate also includes a securing member formed on the body portion. The securing member has an aperture for aligning with a corresponding aperture at a second end of the isolating mount. The isolating mount can pivot about the pivot support during installation of the drive train component within a vehicle, and the isolating mount can be secured to the securing member to prevent pivotal movement after installation of the drive train component within the vehicle.

BRIEF DESCRIPTION OF THE DRAWINGS

The various advantages of the present invention will become apparent to one skilled in the art by reading the following specification and appended claims, and by referencing the followind drawings ings in which:

DETAILED DESCRIPTION OF THE PREFERRED EMBODIMENTS

Figure 1:
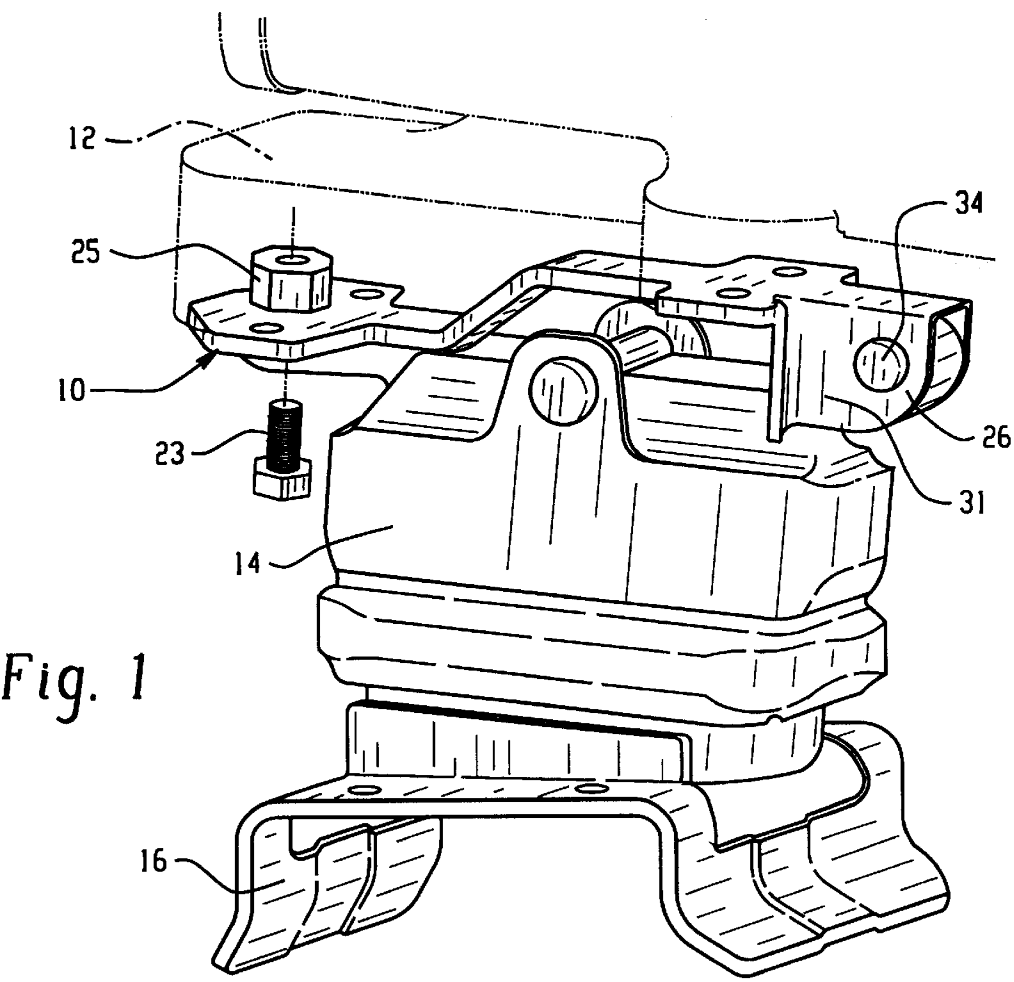
FIG. 1 is a perspective view of the adapter plate and pivot bracket of the present invention shown with a hydraulic isolating mount installed between the drive train and the vehicle frame.

In accordance with the teachings of the present invention, an adapter plate and pivot bracket for simplifying the installation of a drive train and isolating mount within a vehicle is disclosed. FIG. 1 shows an exemplary drive train mounting arrangement in which a hydraulic isolating mount 14 is secured between a drive train or transmission housing 12 and a vehicle frame 16. Rather than directly securing the isolating mount 14 to the transmission housing 12, the adapter plate and pivot bracket 10 of the present invention is used. As will be described in greater detail below, the isolating mount 14 is directly secured to the vehicle frame 16 (after installation) and indirectly secured to the transmission housing 12 through the adapter plate 10.

Figure 2:
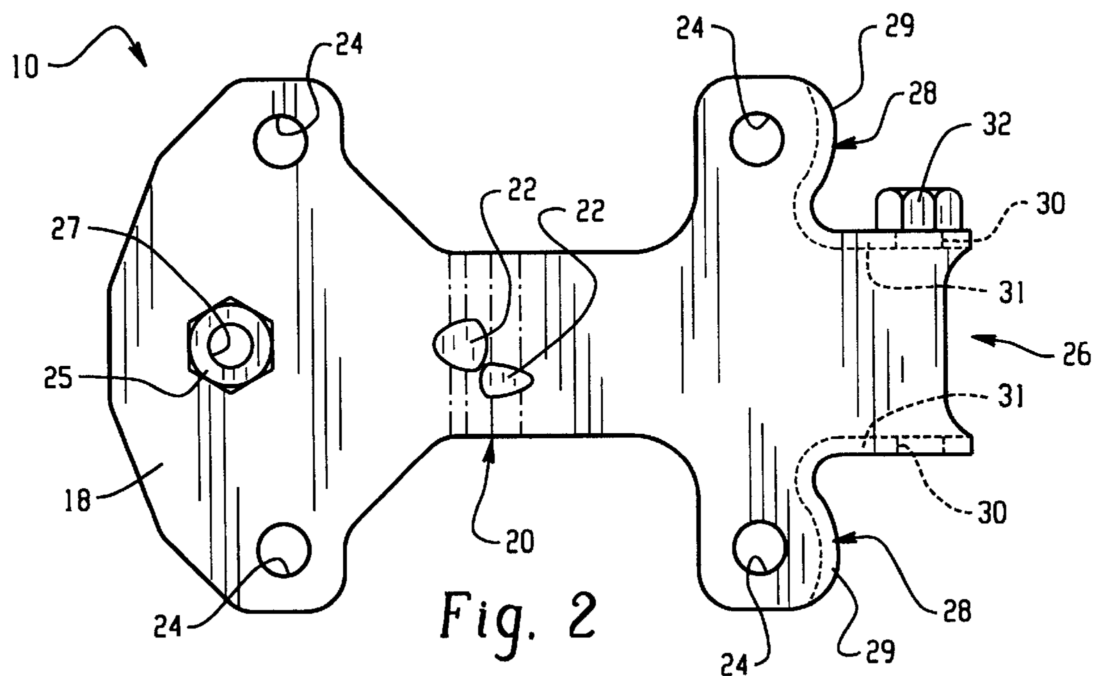
FIG. 2 is a top view of the adapter plate in accordance with a preferred embodiment of the present invention.

FIG. 2 shows a top view of the adapter plate 10 in accordance with a preferred embodiment of the present invention. The adapter plate 10 includes a stamped metal body 18 with a central offset 20 which is reinforced with a pair of stamped gussets 22. The adapter plate 10 preferably includes four mounting apertures 24 at predetermined locations on the metal body 18. The locations of the mounting apertures 24 correspond with complimentary threaded bores (not shown) formed within the transmission housing 12. The adapter plate 10 is secured to the bottom of the transmission housing 12 using suitable threaded fasteners, prior to installation of the drive train assembly. The narrow waist formed around the central offset 20 serves to reduce the overall weight of the adapter plate 10. The isolating mount 14 is preferably a hydraulic mount for absorbing vibration and impact energy. However, the isolating mount 14 can also be an elastomeric mount which does not rely on hydraulic fluid for absorbing vibration and impact energy.

A threaded nut 25 is preferably welded over a corresponding aperture 27 for receiving a securing bolt 23 after installation of the drive train assembly. The threaded nut 25 resides at the front portion of the adapter plate 10. A pivot support 26 is formed at the rear portion of the adapter plate 10 by a pair of pivot flanges 28. Each pivot flange 28 includes an aperture 30. One of the pivot flanges 28 has a threaded nut 32 welded thereto for receiving a retaining bolt 34 which is inserted through the apertures 30 for pivotally securing the isolating mount 14.

Figure 3:
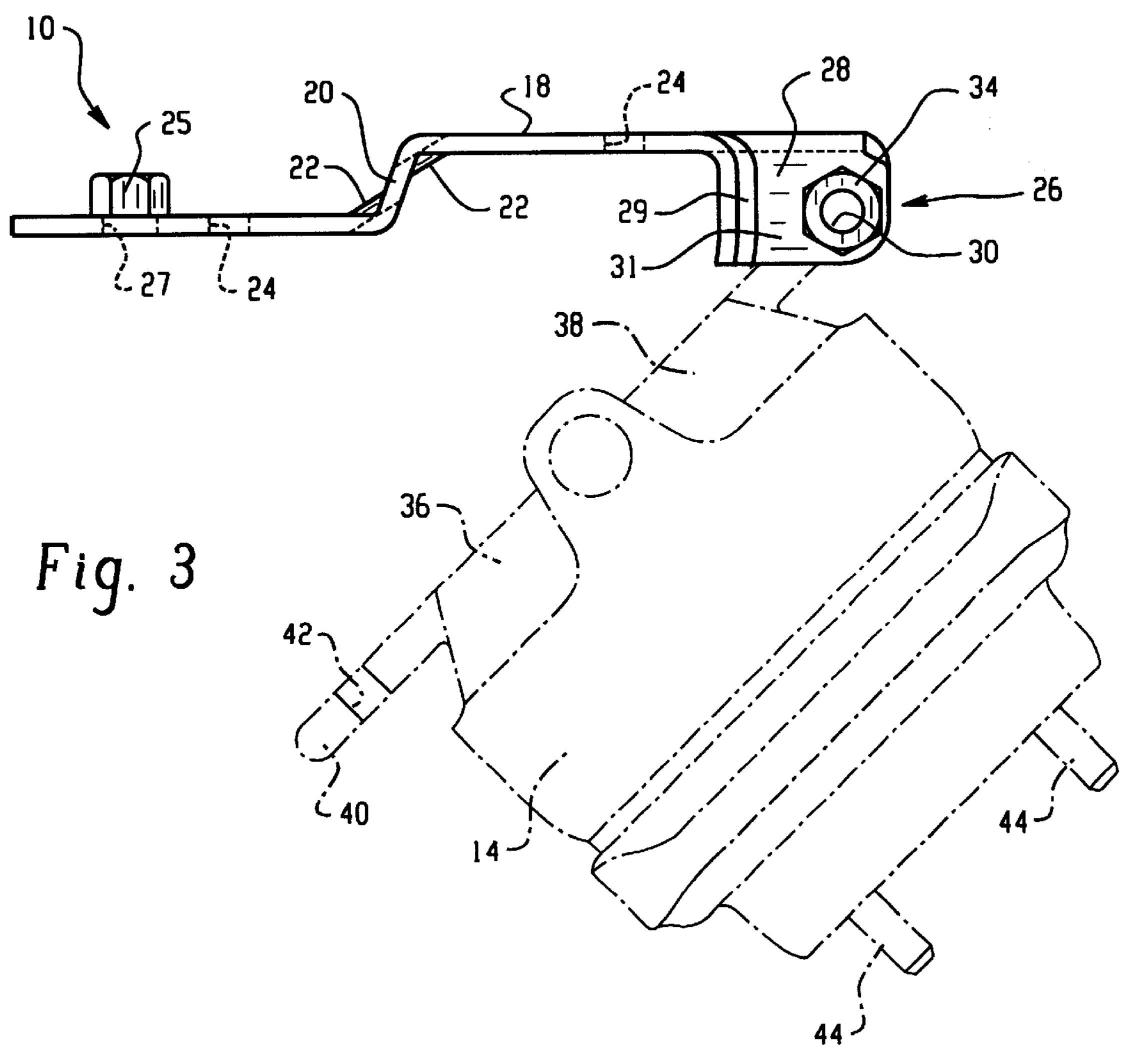
FIG. 3 is a side elevational view of the adapter plate showing the isolating mount pivoted away from the adapter plate.

FIG. 3 illustrates a side view of the adapter plate 10 with the isolating mount 14 pivoted away from the stamped body 18. The central offset 20 and reinforcing gussets 22 are more clearly shown in this view. In addition, the pivot flanges 28 are more clearly shown. Each pivot flange 28 is preferably formed by a pair of orthogonal flange walls 29, 31 which provide additional strength and rigidity. The isolating mount 14 includes a main support 36 formed along its top surface. A pivot arm 38 extends rearwardly from the main support 36, and a securing arm 40 extends forwardly from the main support 36. The securing arm 40 includes an aperture 42 for receiving a threaded fastener, such as fastener 23 (FIG. 1). The mount 14 also includes a pair of mounting studs 44 which are used for securing the bottom of the mount 14 to the vehicle frame 16 after the drive train assembly is installed within the vehicle. When the mount 14 is rotated about the retaining bolt 34 so that the securing arm 40 contacts the underside of the adapter plate 10, the aperture 42 becomes aligned with the fixed nut 25. The securing fastener 23 can then be inserted through the aperture 42 and threaded into the fixed nut 25.

Prior to installation, the adapter plate 10 and isolating mount 14 are preassembled as a single component by securing the pivot arm 38 to the pivot support 26. The assembly is subsequently secured to the transmission housing 12 by securing threaded fasteners through the four mounting apertures 24. At this point, the securing arm 40 of the mount 14 is not secured to the front of the adapter plate 10. Thus, during installation of the drive train assembly, the mount 14 is free to pivot about the pivot support 26 and the retaining bolt 34. This pivot feature allows the mounting studs 44 to be aligned with corresponding apertures (not shown) in the vehicle frame 16 because the mounting studs 44 have significant freedom of movement with respect to the frame. Once the mounting studs 44 are properly located, the drive train installation is continued which forces the mount 14 (and securing arm 40) to rotate upwardly toward the adapter plate 10. When the securing arm 40 contacts the underside of the adapter plate 10, the fastener 23 is secured into the fixed nut 25 and tightened. This step serves to fix the position of the mount 14 with respect to the transmission housing 12. The drive train and mount 14 can then be aligned as necessary with respect to the vehicle frame 16, and the mounting studs 44 secured to the vehicle frame 16.

Figure 4:
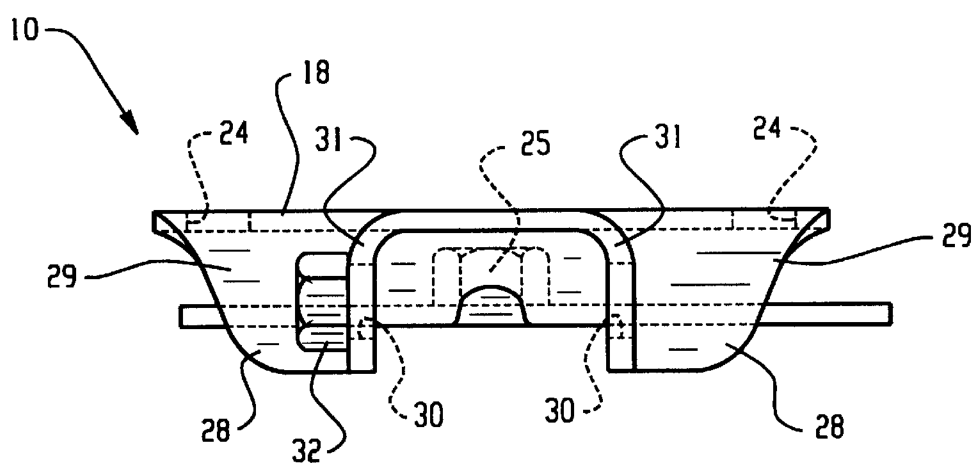
FIG. 4 is a front elevational view of the adapter plate and pivot bracket of the present invention.

FIG. 4 is a front elevation view showing the details associated with the pivot support 26 of the adapter plate 10. More specifically, the pair of orthogonal flange walls 29, 31 which form the pivot support 26 comprise an L-shaped flange 28 which provides additional rigidity to the pivot support 26. As will be appreciated the adapter plate 10 of the present invention can take on a variety shapes and sizes to accommodate different isolating mounts and drive train configurations. Additionally, the body 18 may include a variety of unique configurations for the mounting apertures 24.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A mounting apparatus comprising:

an isolating mount;

a drive train component;

an adapter plate having a body portion which can be secured to the drive train component;

a pivot support formed in the adapter plate, the pivot support receiving a portion of the isolating mount; and a securing aperture formed in the adapter plate, the securing aperture being spaced from the pivot support of the adapter plate, the securing aperture aligning with a corresponding aperture formed in the isolating mount.

2. The mounting apparatus of claim 1 wherein the pivot support includes a pair of pivot flanges, each pivot flange having an aperture for receiving a pivot retainer.

3. The mounting apparatus of claim 2 wherein the isolating mount includes an aperture for aligning with the aperture of each said pivot flange and receiving the pivot retainer.

4. The mounting apparatus of claim 2 wherein each said pivot flange includes a pair of orthogonal flange walls.

5. The mounting apparatus of claim 4 wherein one of the flange walls of each pair includes the aperture for receiving the pivot retainer.

6. The mounting apparatus of claim 2 wherein the pivot retainer is a threaded fastener.

7. The mounting apparatus of claim 2 wherein a threaded nut is secured to a surface of one of the pivot flanges, the threaded nut being aligned with the aperture for receiving the pivot retainer.

8. The mounting apparatus of claim 1 wherein the isolating mount is a hydraulic mount.

9. The mounting apparatus of claim 1 wherein the isolating mount is an elastomeric mount.

10. An adapter plate for pivotally securing an isolating mount to a drive train component comprising:

a body portion which can be secured to an associated drive train component;

a pivot support formed on the body portion, the pivot support having a pivot member including a pair of pivot flanges for pivotally securing a first end of an associated isolating mount, each pivot flange including a pair of orthogonal flange walls, one of the flange walls of each pair having an aperture for receiving a threaded pivot retainer; and a securing member formed on the body portion, the securing member having an aperture for aligning with a corresponding aperture at a second end of the associated isolating mount;

wherein the associated isolating mount can pivot about the pivot support during installation of the associated drive train component within a vehicle, and the associated isolating mount can be secured to the securing member to prevent pivotal movement after installation of the associated drive train component within the associated vehicle.

11. The adapter plate of claim 10 wherein a threaded nut is secured to a surface of one of the pivot flanges, the threaded nut being aligned with the aperture for receiving the threaded pivot retainer.

12. The adapter plate of claim 10 wherein a threaded nut is secured to a surface of the securing member, the threaded nut being aligned with the aperture formed in the securing member for receiving a threaded fastener.

13. The adapter plate of claim 10 wherein the body portion is formed from a metal plate having a plurality of apertures formed therein, each of the apertures receiving a fastener for securing the adapter plate to the associated drive train component.

14. A method for securing a vehicular drive train within a vehicle comprising:

providing an adapter plate having a pivot bracket;

pivotally securing a first end of an isolating mount to the pivot bracket;

securing the adapter plate to the vehicular drive train;

installing the drive train within the vehicle, whereby the isolating mount contacts a vehicle frame and rotates upwardly toward the adapter plate about the pivot bracket; and securing a second end of the isolating mount to the adapter plate.

15. The method of claim 14 wherein the step of securing the adapter plate includes securing the isolating mount to a forward portion of the adapter plate such that the isolating mount can pivot about the pivot bracket.

16. The method of claim 14 wherein the step of securing the adapter plate to the vehicular drive train includes securing a plurality of threaded fasteners through a corresponding plurality of apertures formed in the adapter plate.

17. The method of claim 14 wherein the step of securing the isolating mount to the adapter plate includes securing a threaded fastener through a threaded nut secured over an aperture formed in the adapter plate.

18. The method of claim 14 further including the step of rotating the isolating mount about a pivot arm formed on the isolating mount after the step of installing the drive train within the vehicle.

* * * * *